UNITED STATES PATENT OFFICE.

HEINRICH PRECHT, OF NEUSTASSFURT, GERMANY.

METHOD OF MAKING POTASSIUM-MAGNESIUM CARBONATE.

SPECIFICATION forming part of Letters Patent No. 689,907, dated December 31, 1901.

Application filed October 27, 1900. Serial No. 34,659. (No specimens.)

*To all whom it may concern:*

Be it known that I, HEINRICH PRECHT, a subject of the King of Prussia, German Emperor, and a resident of Neustassfurt, Germany, have invented certain new and useful Improvements in and Relating to the Production of Potassium-Magnesium Carbonate; and I do hereby declare the following to be a full, clear, and exact description of the invention, such as will enable others skilled in the art to which it appertains to make and use the same.

My invention has relation to the production of potassium-magnesium carbonate; and it has for its object a method or process whereby this product can be produced in a more rapid as well as a more economical manner and with a much greater yield than has been possible heretofore.

As is well known, the production of potassium-magnesium carbonate constitutes the basis for the production of potassium carbonate by the magnesia process, as described, for instance, in German Patent No. 15,218, French Patent No. 140,427, and in the patent of the United States No. 252,653, the double salt being formed in accordance with the following equation:

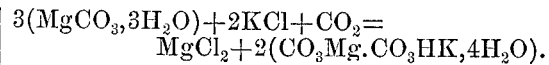

the salt containing four molecules of water of crystallization. I have discovered and experiments have fully demonstrated that by the reaction of carbonic acid the formation of the double carbonate of magnesium and potassium from hydrous carbonate of magnesium and chlorid of potassium proceeds very rapidly and results in a greater yield, a fact unknown before my invention. I have also discovered that the reaction is facilitated and expedited and the yield in double salt increased when a hydrous magnesium carbonate is used which is so constituted that the water combined with the carbonate will be transferred to the potassium-magnesium carbonate without dissociation or yield of water. To this end I use magnesium carbonate containing three molecules of water of crystallization, ($MgCO_3 3H_2O$.) The reaction of carbonic acid upon a concentrated solution of potassium chlorid and magnesium carbonate containing three molecules of water of crystallization takes place according to the following equation:

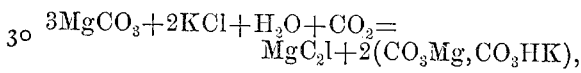

From the above equation, which embodies the basic feature of my invention, admitting, of course, slight variations, the reason why the processes heretofore proposed were practically unsuccessful can be readily deduced. Hence in accordance with my invention potassium and magnesium carbonate is obtained by the reaction of carbonic acid upon potassium chlorid and hydrous magnesium carbonate, preferably magnesium carbonate containing three molecules of water of crystallization in lieu of the anhydrous or substantially anhydrous magnesium carbonate heretofore employed. In this reaction a direct decomposition with interchange of components takes place. Hence the reaction can be completed in a very short time. If the magnesium carbonate used contains less than three molecules of water of crystallization, the reaction will not take place unless the carbonate is dissolved in a solution of carbonic acid, the reaction being, however, somewhat retarded.

The invention may be carried out and is preferably carried out as follows: I form a concentrated solution of, say, seventy kilos of potassium chlorid, holding in suspension, say, one hundred kilos of magnesium carbonate containing three molecules of water of crystallization. This solution is then reacted on with carbonic acid in a well-known manner, whereby the potassium chlorid is mainly converted into the insoluble double salt and into soluble magnesium chlorid, the latter separating out of the reaction in the form of a concentrated solution, from which a portion of the unconverted potassium chlorid can be recovered by evaporation for further use.

Having thus described my invention, what I claim as new therein, and desire to secure by Letters Patent, is—

The process, which consists in reacting with carbonic acid upon a solution of potassium chlorid holding in suspension magnesium carbonate containing three molecules of water of crystallization, for the purpose set forth.

In testimony whereof I affix my signature in presence of two witnesses.

HEINRICH PRECHT.

Witnesses:
 GEORGE H. MURPHY,
 FRIEDRICH WALDAU.